Sept. 10, 1968     C. C. BEUSMAN ET AL     3,401,337
CONNECTOR DEVICE FOR CONNECTING A BATTERY TERMINAL WITH A
BATTERY-LIFE INDICATOR METER
Filed April 9, 1964
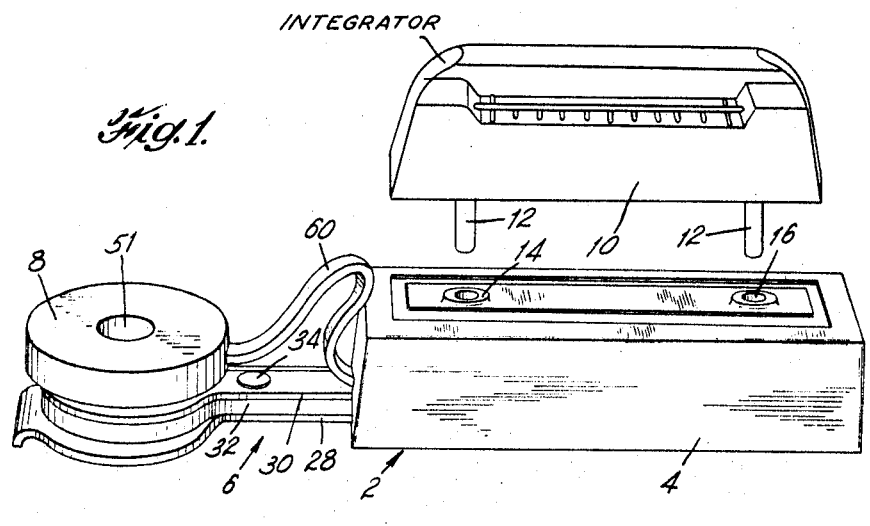
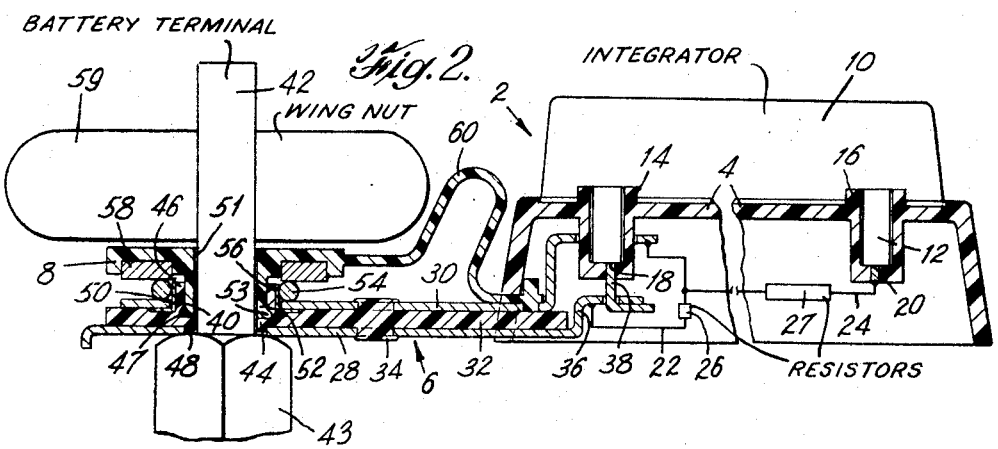
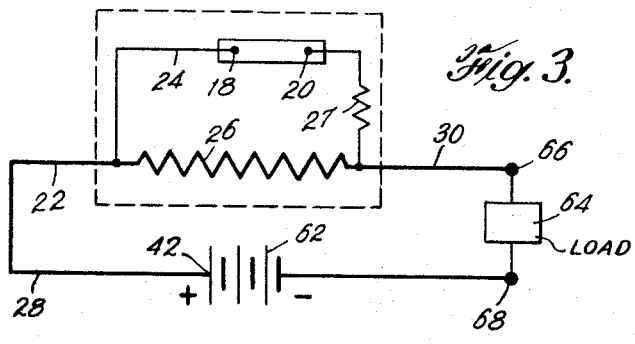
INVENTORS
JACK E. LE MAY
CURTIS C. BEUSMAN
BY *Frederick J. McCarthy*
ATTORNEY United States Patent Office 3,401,337
Patented Sept. 10, 1968

3,401,337
CONNECTOR DEVICE FOR CONNECTING A BATTERY TERMINAL WITH A BATTERY-LIFE INDICATOR METER
Curtis C. Beusman and Jack E. Le May, Mount Kisco, N.Y., assignors to Union Carbide Corporation, a corporation of New York
Filed Apr. 9, 1964, Ser. No. 358,528
1 Claim. (Cl. 324—149)

ABSTRACT OF THE DISCLOSURE

Connector device for connecting a battery terminal to a battery-life indicator meter involving an arrangement of conducting elements and insulating elements which surroundingly engage the battery terminal.

This invention relates to the measurement of current in electrical circuitry and is more particularly directed to a means which may be integrally connected in an electric circuit to facilitate the detection and measurement of current. The invention is more particularly directed to a shunt device having a series shunt resistor, a means for directly mounting the shunt device upon an output terminal of a source of electric current, and a means for electrically connecting a suitable meter to the series shunt resistor. In the preferred embodiment of the invention the shunt device is integrally mounted upon the output terminal of a battery as a circuit element and remains in position there during the life of the battery.

A conventional technique for measuring the electric current supplied to a load from a source requires the connection of a resistance of predetermined value in the load line. One may then measure the voltage drop across the resistor and the measured value of voltage can be translated to a corresponding value of current or the meter may be calibrated to indicate current directly. The resistor used for these purposes is ordinarily referred to as a "series shunt-resistor." It is a series resistor in the sense that it is connected in series with the load line and is a shunt resistor in that it is in parallel with the meter.

If the measurement at a given location is made only infrequently and for a short time, it is satisfactory to insert the resistance into the load line by means of temporary wire connections and without much concern for convenience or structural integrity or reliability of the connections over any extended period of time. There are, however, many instances which require that accurate readings be taken frequently or even continuously over long periods and further require that such readings be made quickly and conveniently. An example of such use is with respect to primary batteries used for signal purposes. There, to insure safe operation and proper maintenance of the signal system, it is necessary to know at all times the state of exhaustion of the battery.

Ever increasing use is being made of direct reading current integrating meters which indicate the state of discharge of primary batteries. An example of this type of meter is found in the patent to Corrsin No. 3,045,178, entitled, "Operating Time Indicator." It is desirable to have such a meter attached directly to the battery at all times so that an evaluation of the remaining life of the battery can be made at a glance. Moreover, it is desirable that the normal means of connecting the battery in a load circuit be altered as little as possible and that distinct, readily identifiable test points for connection of a suitable meter such as an ampere hour meter or the aforementioned electrochemical integrator, be provided immediately adjacent the series resistance.

The present invention is directed to a means integrally mounted in an electrical circuit which enables quick, accurate, and convenient measurements to be made. The device made in accordance with the invention may be easily connected in a load circuit with little change in the usual load circuit connections and has test points adaptable to connect a suitable meter such as an electrochemical integrator. The device provides excellent circuit contacts between the energy source and the load line.

Preferably the device is used in connection with a battery and is installed upon one terminal of the battery with an electrochemical integrator inserted into the test points adapted for that purpose. The electrochemical integrator measures the state of exhaustion of the battery on a continuous basis. When the battery approaches the end of its useful life the device may be removed and reused, with a new or reset integrator, upon another battery.

The device is extremely simple to mount, requiring neither talent on the part of a service man nor special connecting equipment. There is virtually no chance of error respecting its installation. The external connections to a battery are made just as they are without a device and all necessary connecting elements are built into the device itself.

Broadly, the present invention is for a shunt device for integral connection in an electric circuit which shunt device is adapted for use with a current integrating meter. The shunt device comprises a base having a series shunt resistor and means for connecting the meter with the series shunt resistor. A connector element for contacting an energy source and a load line is also part of the shunt device. The connector element comprises an input conductor in series with the series shunt resistor, the input conductor forming the lower portion of the connector element. A return conductor forming the upper portion of the connector element is also in series with the series shunt resistor. An insulating spacer separates the conductors from each other and further has a flange portion separating the return conductor from the energy source. An insulating washer for holding the load line in contact with the return conductor is also provided.

Further features and advantages are apparent from the following detailed description of a preferred embodiment of the invention and the accompanying drawings, in which:

FIG. 1 is a view of the shunt device showing a removable electrochemical integrator;

FIG. 2 is a sectional elevation of the shunt device; and

FIG. 3 is a simplified block and schematic diagram of a portion of the invention.

Referring to FIGS. 1 and 2, the shunt device is referred to, generally, as 2. The shunt device 2 comprises a meter base housing 4, a connector arm 6 and an insulating washer 8. Shown as dotted lines is an electrochemical integrator 10 having plugs 12. The electrochemical integrator is a meter which is preferably used in connection with the present invention and may remain in position during the life of the battery, but other suitable metering devices may also be used.

The meter base housing 4 is preferably made of a dielectric material such as an epoxy resin and is provided with taps 14 and 16 suitable for accepting the plugs 12 of the integrator 10. Contact points 18 and 20 are provided at the base of taps 14 and 16 respectively. Within the meter base housing 4 is contained a shunt line 22 and metering line 24. Interposed in shunt line 22 is a calibrated shunt resistor 26. Metering line 24 is connected at its one end to contact point 20 of tap 16 and at its other end to shunt line 22. In the metering line 24 is interposed a ballast resistor 27.

The leads to the shunt line 22 are metal conductive strips 28 and 30 which together with an insulating spacer 32 comprise the principal elements of connector arm 6. Insulating spacer 32 is preferably made of a synthetic dielectric material and is formed with nibs 34 which cooperate with openings in the conductive strips to align all parts of the connector arm 6. Conductive strip 28 will be referred to as the input conductor and it forms the lower portion of the connector arm 6. Input conductor 28 is electrically connected in series to shunt line 22 by suitable means. Input conductor 28 is also in electrical contact with contact point 18, that contact being made in the preferred embodiment by a bent portion 36 interlocking with a depending metal elbow 38 from contact 18. Conductive strip 30, referred to as a return conductor, forms the upper portion of the connector arm 6 and is spaced from input conductor 28 by insulating spacer 32. Return conductor 30 is electrically connected at its inner end with shunt line 22 to form a continuous electrical line in series with input conductor 28.

The connector arm 6 is provided with an opening 40 to permit the arm 6 to be slipped over the threaded terminal post 42 of a battery. The opening 40 is substantially surrounded by the insulating spacer 32 which has annularly extending flange portions 44 and 46 defining the opening. Thus, flange portions 44 and 46 form an annular internal collar portion substantially surrounding the opening. In forming the connector arm 6 holes 48 and 50 are provided in conductive strips 28 and 30 respectively which holes are relatively larger than opening 40 and are arranged in alignment therewith. Thus, the inner faces of the conductive strips 28 and 30 are insulated against contact with the terminal post 42. Additionally, flange portion 46 is spaced further from terminal post 42 than annularly extending collar portion 52 so that collar portion 52 can be positioned between flange portion 46 and terminal post 42 and to thus engage with insulating spacer 32 and hence arm 6. Insulating washer 8 also has a central opening 51 so that it may be fitted over the terminal post 42.

In a preferred embodiment, flange portion 46 is slightly beveled or recessed as shown at 47 and the annular collar portion 52 of insulating washer 8 is provided with a lip 53 so as to result in an engagement of these parts. With washer 8 being made of polypropylene or the like, only hand pressure is required to engage the parts. Such an arrangement permits the use of the present invention, in most instances, without the use of a wing-nut or other type of holding device on the battery terminal.

In use the contact arm 6 of shunt device 2 is slipped over terminal post 42. Input conductor 28 is thus in contact at its lower face with shoulder portion 43 of the terminal post. A load wire 54 is in contact with return conductor 30. To permit a broad area of contact between load wire 54 and return conductor 30 an annular angled metal inset 56, forming a collar about flange portion 46, is provided in connector arm 6. A brass washer 58 is provided in insulating washer 8 to aid in firm contact between the washer and the load wire 54 when wing-nut 59 is tightened upon post 42. A flexible link 60 of suitable non-conductive material is also provided between insulating washer 8 and is engaged with meter base housing 4 together with insulating spacer 32 and conductors 28 and 30. This engagement holds insulating spacer 32, and conductors 28 and 30 substantially fixed and in alignment with respect to their annular passages but permits insulating washer 8 to be readily engaged and detached.

FIG. 3 is a schematic showing the series shunt circuit in simplified form. There an electrical source 62, preferably a battery, is shown with the shunt line 22 connected thereto. Series shunt resistor 26 is interposed in the line 22 and metering line 24 is in electrical connection with shunt line 22 at either side of the shunt resistor 26. Ballast resistor 27 and tap contacts 18 and 20 are in metering line 24. Contacts to be driven load 64 are represented as 66 and 68.

A clearer understanding of the structure of the device will be had by describing the parts in relation to current flow.

Broadly, the current flow is from terminal post 42 to the connector arm 6 into the meter base housing 4. The current leaves meter base housing 4 via connector arm 6 and enters load wire 54. The circuit is completed when the current passes through the mechanism 64 using the electrical energy (e.g. a signal light) and returns to the battery.

More specifically, current from shoulder portion 43 of terminal post 42 enters connector arm 6 via input conductor 28. Current flows to shunt line 22 within meter base housing 4 and out through the upper portion of connector arm 6 via return conductor 30. Current then passes to the load wire 54 directly and via metal inset 56. After the current has passed through load wire 54 to the load mechanism it returns to the battery.

For the purpose of meter readings a portion of the current is taken off to the meter 10 via interlocking portions 36 and 38 and contact 18. The current, upon passing through the meter 10, returns to the shunt wire 22 via contact 20, ballast resistor 27 and metering line circuit 24.

From the foregoing it can be seen that several new results have been achieved. A meter base is provided which can be installed on a terminal in a manner similar to the usual installations of a load wire. The connecting arm 6 of the meter base housing 4 is merely slipped over the terminal 42, the load wire 54 positioned, the insulating washer 8 is placed on next and wing-nut 59 is fastened to hold all parts in position. The meter base housing 4 may be thus left indefinitely. The current from the battery passes through the meter base and exits through the load wire 54 without any possibility of short circuiting. This is primarily because of the cooperating structure of insulated flange portions 44 and 46 of the connecting arm 6 and the collar 52 of locking insulator 8.

What is claimed is:

1. In combination, with a battery having an extended battery terminal, a battery circuit load line and an indicating device for providing an indication of the state of the battery and a connecting device, for placing the indicating device in circuit with the battery said connecting device comprising
    (a) a first conductive element having an annular passage therethrough surroundingly engaging the extended battery terminal of said battery and being in electrical connection therewith,
    (b) a second conductive element having an annular passage therethrough surroundingly engaging the extended battery terminal of said battery but being insulated therefrom, said second conductive element being in electrical contact with a circuit connected to said battery,
    (c) a first insulating member having an annular passage therethrough surroundingly engaging the extended battery terminal of said battery and arranged in contact and between said first and second conductive elements to provide insulation therebetween, said first insulating member also having an annular passage surroundingly engaging the extended battery terminal of said battery and being arranged within the annular passage of said second conducting element, the aforesaid conductive elements and insulating member being held substantially fixed with respect to each other and having their annular passages substantially in alignment,
    (d) a second insulating member having an annular passage therethrough surroundingly engaging the extended battery terminal of said battery and having an annular extension coaxial with its annular passage removably inserted within the annular passage of said first insulating member and in engagement therewith and to provide a holding engagement for the battery circuit load line in contact with said second conductive element,
(e) means engaging all of the aforesaid conductive elements and insulating members to hold the first and second conductive elements and the first insulating member in alignment with respect to their respective annular passages and to flexibly hold the second insulating member so as to permit the engagement and detachment thereof from the first insulating member and
(f) electrical conductor means for connecting the indicating device in circuit with said first and second conductive elements.

References Cited

UNITED STATES PATENTS

| | | | |
|---|---|---|---|
| 964,995 | 7/1910 | Marko | 324—29.5 X |
| 1,610,304 | 12/1926 | Mabie | 324—149 |
| 1,772,217 | 8/1930 | Heyer | 324—29.5 |
| 2,270,554 | 1/1942 | Pugh | 324—29.5 X |
| 2,829,336 | 4/1958 | Heyer | 324—29.5 |
| 3,302,102 | 1/1967 | Lace | 324—149 X |
| 3,345,491 | 10/1967 | Badger et al. | 324—29.5 X |

RUDOLPH V. ROLINEC, *Primary Examiner.*

C. F. ROBERTS, *Assistant Examiner.*